Figure 2:
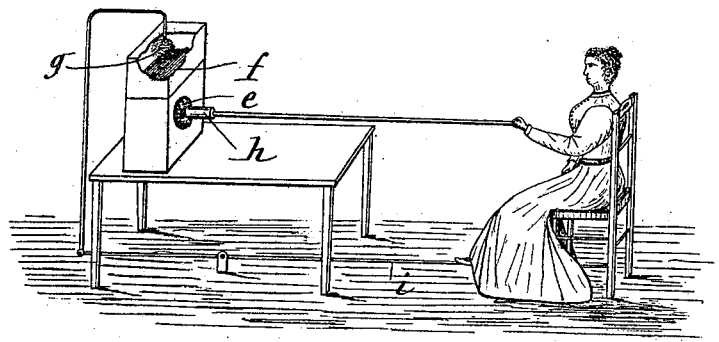

No. 684,056. Patented Oct. 8, 1901.
N. GEILLE.
PROCESS OF HARDENING GLASS.
(Application filed Sept. 18, 1899.)

(No Model.)

WITNESSES:
Ella L. Giles
Clara D. Frohbach

INVENTOR
Nestor Geille
BY
Richardson
ATTORNEYS

THE NORRIS PETERS CO., PHOTO-LITHO., WASHINGTON, D. C.

UNITED STATES PATENT OFFICE.

NESTOR GEILLE, OF BRUSSELS, BELGIUM, ASSIGNOR TO SOCIÉTÉ ANONYME DES VERRERIES DE BRUXELLES, OF SAME PLACE.

PROCESS OF HARDENING GLASS.

SPECIFICATION forming part of Letters Patent No. 684,056, dated October 8, 1901.

Application filed September 18, 1899. Serial No. 730,902. (No specimens.)

*To all whom it may concern:*

Be it known that I, NESTOR GEILLE, industrial, a subject of the King of Belgium, and a resident of 17 Rue Genard, Brussels, Belgium, have invented a certain new Process for the Hardening of Glass, of which the following is a specification.

This invention relates to a method or process for hardening of glass, which is adapted both to the complete hardening of smooth and ground glasses and to the hardening of rims on thin glasses. The method includes the essential step of submitting the article or the part of the article to be hardened to a preliminary rough-grinding before it is dipped into the hardening-bath. On smooth glasses the bottom and the sides of the glass at the thickened part forming the bottom are roughly ground, as this part is the thickest, and consequently the part most difficult to harden. If only the rims on thin glasses are to be hardened, only these rims are roughly ground on the iron wheel. In each instance the purpose is the same, and it can be readily understood that this preliminary rough-grinding, which is operated previous to hardening, will always serve to prepare or obtain a wrinkled rough surface, which facilitates eminently the penetration of the hardening-bath into the glass.

The hardening of articles of glass by dipping them in heated condition into an oil-bath is a well-known operation. The heating of the completed object must only be carried to such a point that no deformation of the same takes place. It must be considered that glasses, and especially the ordinary tumblers, have very thick bottoms as compared with the thickness of the rims, and which therefore heat more slowly than the rims. However, since it is necessary in order to obtain an even annealing that the entire glass be submitted to the same high temperature it happens often that the walls of the tumblers soften and become deformed before the bottoms are sufficiently heated. The process here submitted prevents this drawback, since the toughening of the bottom or other parts is greatly facilitated on account of the greater thickness of the walls. To accomplish this, the lower and side surface of the bottom is roughened and thinned before subjecting the article to the bath, and thus the penetration of the hardening-bath into the glass is facilitated. Thus the glass is excellently hardened throughout—that is, in all parts—as the hardening of the upper thinner part is thoroughly assured, inasmuch as this part possesses the determined necessary temperature for hardening, while the lower or more massive and less-heated part is also permeated by the bath on account of the roughness of its surface, as above mentioned, and also because the place to be hardened is thus thinned down. Hence the hardening-bath operates in such a manner that the hardening takes place in all parts regularly. After the hardening is accomplished the glass is removed from the bath and the rough surfaces of the bottom are worked on the second grinding and polishing wheel to overcome the roughness and to finish the manufacture of the glass.

The described process is also well adapted for hardening cut objects, and to that end it presents besides the advantage of good hardening the further special advantage that a more perfect cut is obtained, which is derived from the fact that the hardening method is only operated after the first shaping—that is, after the rough-cutting on the iron wheel.

As well known, glass-cutting consists of three principal phases—shaping or rough-cutting on the iron wheel or wheel-mill, cutting on the grinder, and finally polishing on the wood or cork wheel. By the old process hardening took place before the first grinding operation—viz., before the rough-fashioning. In that operation the objects coming in finished condition from the hand of the glass-blower were heated to low red heat, dipped into a heated hardening or tempering bath, allowed to cool therein slowly, and cut thereafter. The product does not, however, compare with the modern product, and, moreover, the loss during the first fashioning—the cutting proper—is very considerable, because the preliminary hardening renders cutting difficult and expensive. By the present process hardening is effected, as it were, during the different cutting phases—viz., after fashioning with the iron wheel, but before the final cutting on the emery and polishing wheel. The result is a fine cut with but slight breakage.

The operating method for cut goods is as follows: The object is first given its precise dimensions and cooled, and then it is fashioned on the iron wheel. As before pointed out, the surfaces remain unworked, and with their still rough surfaces they are especially suited to the action of the tempering-bath into which they are dipped. Thereafter the objects are removed from the bath and worked further in the usual manner—viz., smoothed and polished.

The preceding data have referred to the manufacture of entirely-hardened objects; but there are varieties of products in which only the rim needs to be hardened. These latter kinds present great advantages without having the objection of the former, particularly as regards objects with thin rims and the so-called "enameled" sheet-glasses or thin muslin-glasses.

To make the following subject-matter readily clear, the accompanying drawings are referred to, in which—

Figure 1:
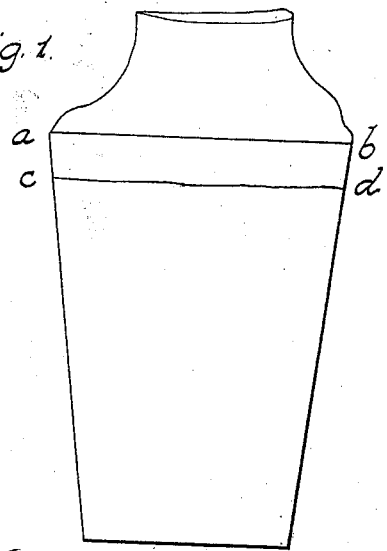

Figure 1 represents a concave or hollow glass just from the glass-blower's pipe, and Fig. 2 illustrates the working operation.

According to the method hitherto employed the object, as represented by Fig. 1 of the drawings, this showing a hollow glass just removed from the glass-blower's pipe, is first cut to a desired measure along the line $a\, b$ after a previous annealing. In order to smooth this uneven rim $a\, b$, the article was again heated by means of a furnace, a burner, a jet-flame, or the like. This gave rise to a series of drawbacks, which originated in the main from the fact that the reheating neutralized the previous annealing of the upper part $a\, b\, c\, d$, which was exposed to the heat. This uneven treatment of the glass occasioned a considerable loss in breakage, which may rise from forty to fifty per cent., and is characterized principally in that the upper rim is detached along the line $c\, d$, even if no shock takes place. This drawback is now prevented when the rims are hardened by the process heretofore described, whereby a great solidity of the rim is obtained, but the breakage is avoided.

The process consists, essentially, in working the rims $a\, b$, before the hardening process, on the iron wheel for the purpose of making the rims rough and wrinkled, so that the hardening or tempering bath can well penetrate the same. The hardening of the rims is best executed in the manner represented by Fig. 2. For warming the bath the heat of a jet-flame or furnace $e$ is utilized, which serves to heat the same by setting the reservoir $f$, containing the bath, on this furnace. A spongy material $g$, bathing-sponge, or an analogous substance dips into the reservoir $f$ and is held therein—for instance, by a foot-actuated lever $i$.

The process takes place as follows: The rims having been previously annealed are then roughened by the iron wheel working, whereupon they are hardened. For this purpose the rim of the glass $h$ is brought to the proper temperature by holding the glass horizontally, its rim standing in the flame $e$. The glass $h$ is then guided by an upward movement in a level with the saturated sponge $g$, this latter being pulled out of the reservoir $f$ by means of the lever $i$, and the glass is horizontally brought against the sponge, so as to moisten and consequently to harden its rim, the hardening being facilitated by the roughness of the rim. Hence the hardening takes place in such a manner that the workman can pull out the spongy mass without leaving his place and hold the glass into this mass in horizontal position, thus hardening it without the loss of a moment.

I claim as my invention—

1. The herein-described process of hardening glass consisting in first roughening the part to be hardened, and then subjecting the same to a hardening-bath, substantially as described.

2. The herein-described process of manufacturing hardened glass which consists in roughening the edge of the glass, heating the same while it is held in a horizontal position, and then raising it into contact with the tempering medium while maintaining its horizontal position, substantially as described.

In witness whereof I have hereunto set my hand in presence of two witnesses.

NESTOR GEILLE.

Witnesses:
PIERRE TÉVOL,
EDOUARD THIRIONET.